United States Patent [19]

Milanowski et al.

[11] Patent Number: 5,323,478

[45] Date of Patent: Jun. 21, 1994

[54] ASSEMBLY OF STACKED AND HINGED MODULES

[75] Inventors: Michel Milanowski, Anserville; Alain Vincent, Juilly, both of France

[73] Assignee: Mars Actel, Vrigne aux Bois, France

[21] Appl. No.: 20,976

[22] Filed: Feb. 22, 1993

[30] Foreign Application Priority Data

Feb. 21, 1992 [FR] France .............................. 92 02030

[51] Int. Cl.[5] ................................................ G02B 6/36
[52] U.S. Cl. .................................................... 385/135
[58] Field of Search ................. 385/53, 134, 135, 137, 385/147

[56] References Cited

U.S. PATENT DOCUMENTS

| 4,266,853 | 5/1981 | Hutchins et al. | 385/135 |
| 4,832,436 | 5/1989 | Goto et al. | 385/53 |
| 4,911,521 | 3/1990 | Ryuto et al. | 385/135 |
| 4,913,522 | 4/1990 | Nolf et al. | 385/135 X |
| 4,927,227 | 5/1990 | Bensel, III et al. | 385/135 |
| 5,222,183 | 6/1993 | Daems et al. | 385/135 |
| 5,222,184 | 6/1993 | Foss | 385/135 |

FOREIGN PATENT DOCUMENTS

| 0085911 | 8/1983 | European Pat. Off. . |
| 2646928 | 11/1990 | France . |
| WO8905989 | 6/1989 | PCT Int'l Appl. . |

Primary Examiner—John D. Lee
Attorney, Agent, or Firm—Sughrue, Mion, Zinn, Macpeak & Seas

[57] ABSTRACT

The assembly of stacked and hinged modules includes holding and hinging means for holding and hinging the individual modules. Said means are constituted by an assembling and hinging strip mounted and retained directly on a first edge of each module, and having individual hinges for hinging the modules. Application: an assembly of cassettes for optical fibers.

23 Claims, 9 Drawing Sheets

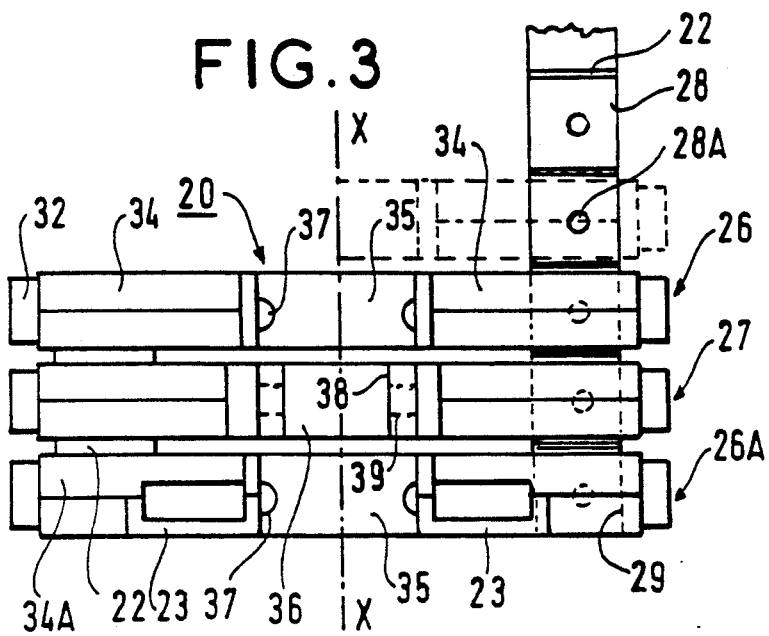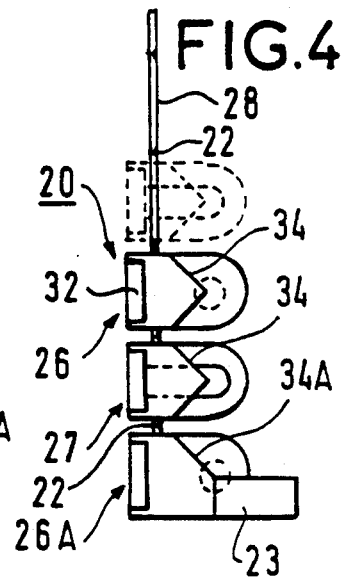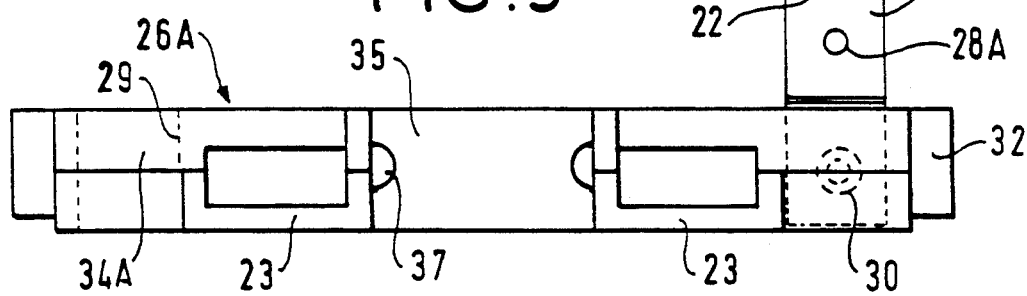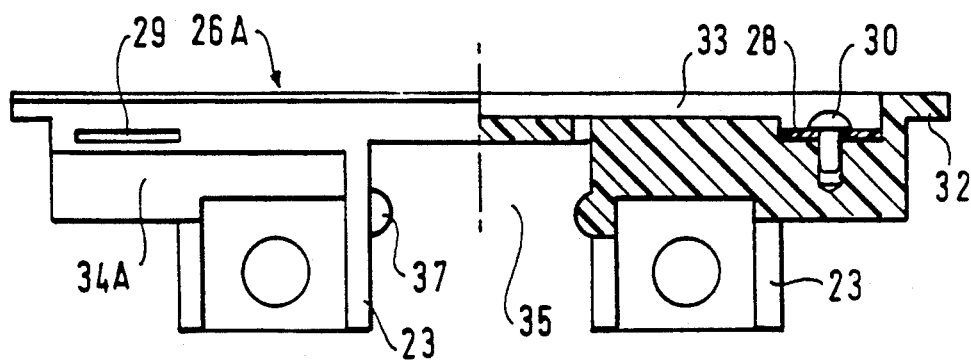

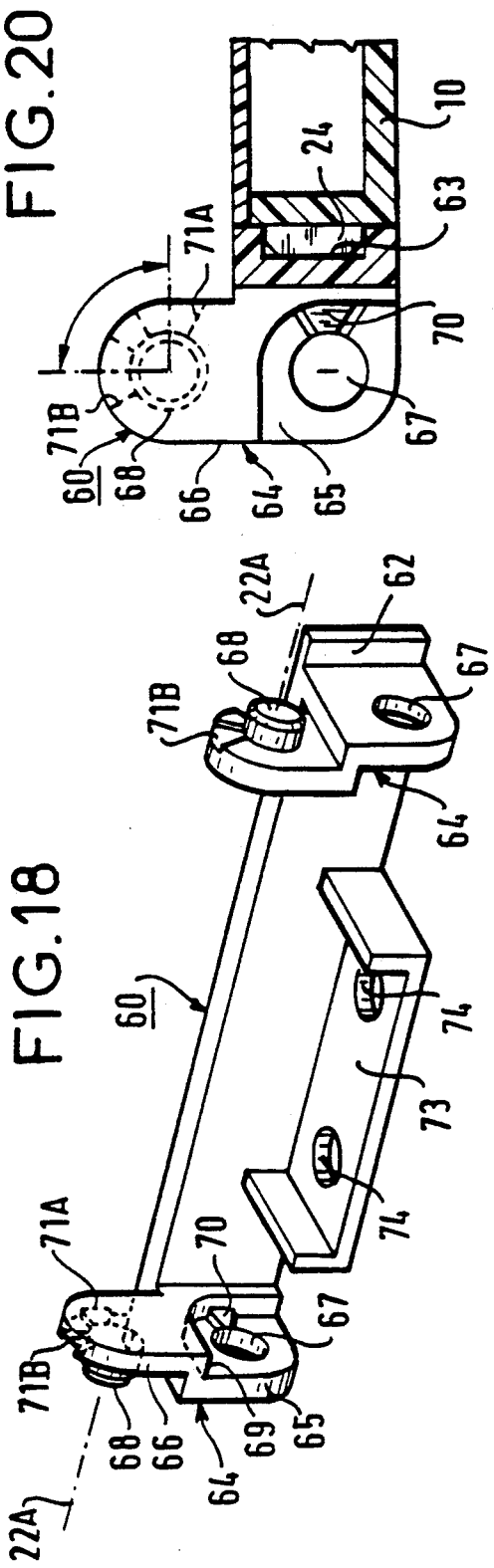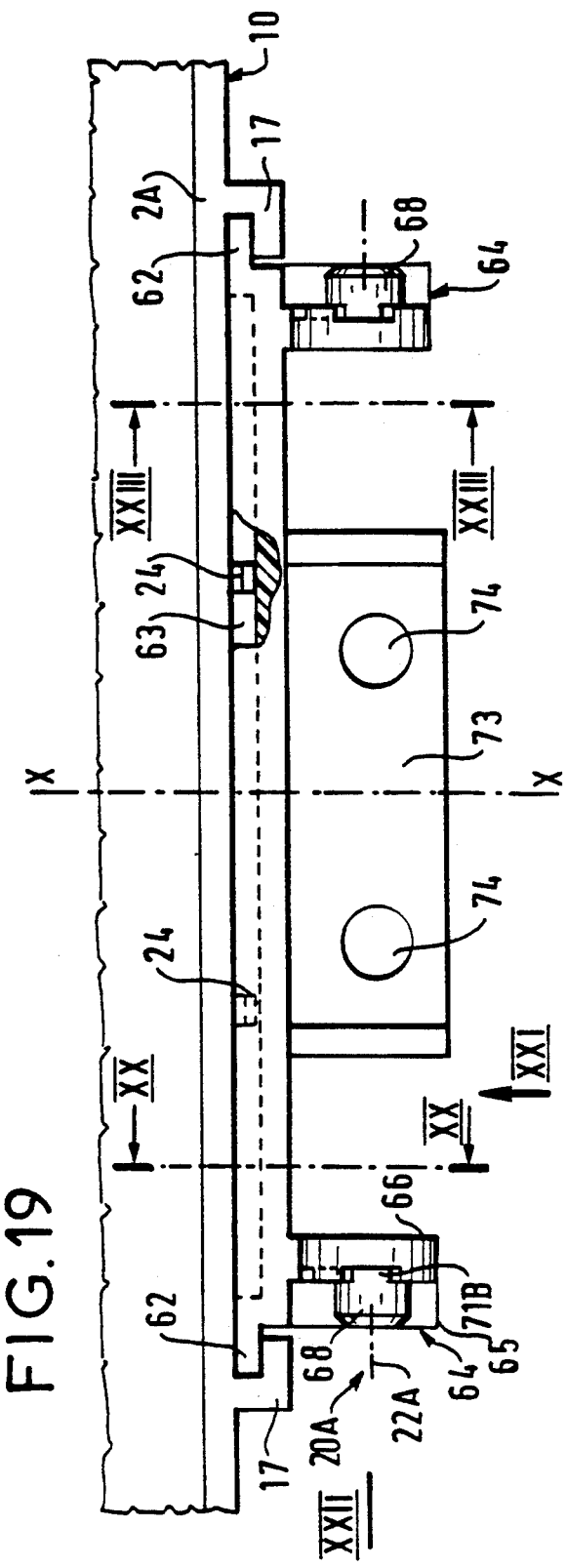

ASSEMBLY OF STACKED AND HINGED MODULES

The present invention relates to assembling superposable modules together to form an assembly, the modules being made accessible in said assembly by opening the modules about respective hinge axes provided for them. The invention relates to such an assembly of stacked and hinged modules, in which assembly said modules are more specifically cassettes for coiling and optionally interconnecting optical fibers.

BACKGROUND OF THE INVENTION

Such cassettes are housings for coiling and protecting optical fibers, and often also for protecting connections or "splices" between the coiled optical fibers. Such cassettes are used for connecting various optical cables together, or for connecting an optical cable to optical jumpers. Each cassette is assigned to two fibers to be connected together, or preferably to several fibers to be respectively connected to several other fibers.

In general, a plurality of cassettes are assigned to handling all the fibers of one or more optical cables to be connected to one or more other optical cables or jumpers inside a splice box. The cassettes are stacked together to form an assembly so as to take up less space inside the splice box, and they are hinge mounted so that each of them can be accessed, in particular for maintenance purposes.

Document FR-A- 2,646,928 describes such an assembly of cassettes inside a splice box for optical fibers. In that document, the assembly of cassettes is mounted at the end of a support plate on which the ends of the cables to be interconnected are fixed. The support plate has side flanges to delimit a protected space in which to transfer the fibers to the assembly of cassettes, surplus lengths being left on the fibers at the ends of the cables.

In that assembly, the cassettes are stacked such that they are slightly offset from one another, and are hinged about individual axes that are similarly offset from one another. To that end, each of the cassettes carries a pair of side arms that swing about a pair of hinge axes on the side flanges of the support plate. Each cassette has a limited possible rotary stroke through which to rotate relative to the plane of the support plate, so that the cassette can be put into the open position transversely to the support plate. Temporary snap-fastening means are provided at the coupling between each pair of arms and the corresponding pair of hinge axes to limit said rotary stroke, and to define an open position.

Such dispositions for assembling and opening the cassettes are relatively complex, are difficult to implement, and are fragile. They require the assembly and the cassettes making up the assembly to be held on the flanges of a channel-section support. With such dispositions, it is relatively difficult to open the cassettes, because they are mounted on long hinged arms. Although the dispositions are organized to limit excessive stresses on the fibers and excessive curvature thereof, the lack of stability of the cassettes when they are being opened prevents the fibers from being properly held under the required conditions.

OBJECT AND SUMMARY OF THE INVENTION

An object of the present invention is to avoid such drawbacks by enabling each of the modules to be both assembled and hinged simultaneously, substantially via one of the edges of the module.

The invention provides an assembly of stacked and hinged modules, in which assembly each of said modules is flat and substantially rectangular, and has two large superposable faces and two pairs of opposite peripheral edges, said assembly including a support and holding and hinging means for holding and hinging the individual modules, with the possible exception of the end module, referred to as the "first" module of the assembly, which first module is held fixed and defines a "closed" position for each of the other modules relative to said first module, wherein said support is an assembling and hinging strip including firstly first assembling and retaining means for assembling and retaining said modules substantially against a "front" face of said strip, and secondly individual hinges which are respectively at the pitch of said stacked modules of said assembly, and wherein, on a first one of said edges, each of said modules is equipped with second assembling and retaining means complementary to said first assembling and retaining means, for locking the module to said strip.

The assembly further has at least one of the following additional features:

it further includes a plane base support on which said modules are stacked, and said strip includes at least one fixing bracket for fixing said strip to said base support;

on the "front" face of the strip, it includes successive abutments extending facing one another on the successive elements of the strip, but being offset angularly by substantially 90° from one of said elements to the next, thereby defining an "open" position about the hinge for the module in question.

said strip is made of one piece and includes sections of small thickness defining the hinges, or it is constituted by individual elements assembled together without touching one after another by means of at least one assembling tape defining said hinges between them, or it is constituted by elements fitted together one after another and simultaneously defining said hinges;

the edge opposite from the first edge of each of the modules is equipped identically to the first edge with second assembling and retaining means for selectively mounting said strip on one of the edges referred to as the "first hinge edge";

the assembly further includes locking devices for locking the modules to one another, which locking devices are adapted and mounted individually on the opposite edge from said first hinge edge of each module, and are individually equipped with third assembling and retaining means identical to said first assembling and retaining means provided on said strip;

each device is provided with a pair of fingers, and a corresponding pair of holes, for centering the devices on one another;

said modules are cassettes for coiling and interconnecting optical fibers; and each cassette includes four possible accesses, substantially at the four corners of the cassette, for receiving said fibers, among which accesses the "selected" accesses receiving said fibers are those furthest from the first edge carrying said strip.

BRIEF DESCRIPTION OF THE DRAWINGS

The characteristics and advantages of the present invention appear from the following detailed description of embodiments given with reference to the accompanying drawings, in which:

FIG. 3 is a front view of an assembling and hinging strip belonging to said assembly in a first embodiment or a second embodiment;

FIG. 4 is a side view of FIG. 3 in the direction of arrow IV;

FIG. 5 is a front view of a bottom "male" element of the assembling and hinging strip of the second embodiment;

FIG. 6 is a plan view in half-section of the element shown in FIG. 5;

FIG. 18 is a perspective view of an element of an assembling an hinging strip of a third embodiment;

FIG. 19 is a plan view of the element shown in FIG. 18 mounted on a cassette that is shown in part, this view also being a plan view of the resulting strip on the corresponding cassettes;

FIG. 20 is a view in section on line XX—XX shown in FIG. 19; and

DESCRIPTION OF THE PREFERRED EMBODIMENTS

Figure 1:
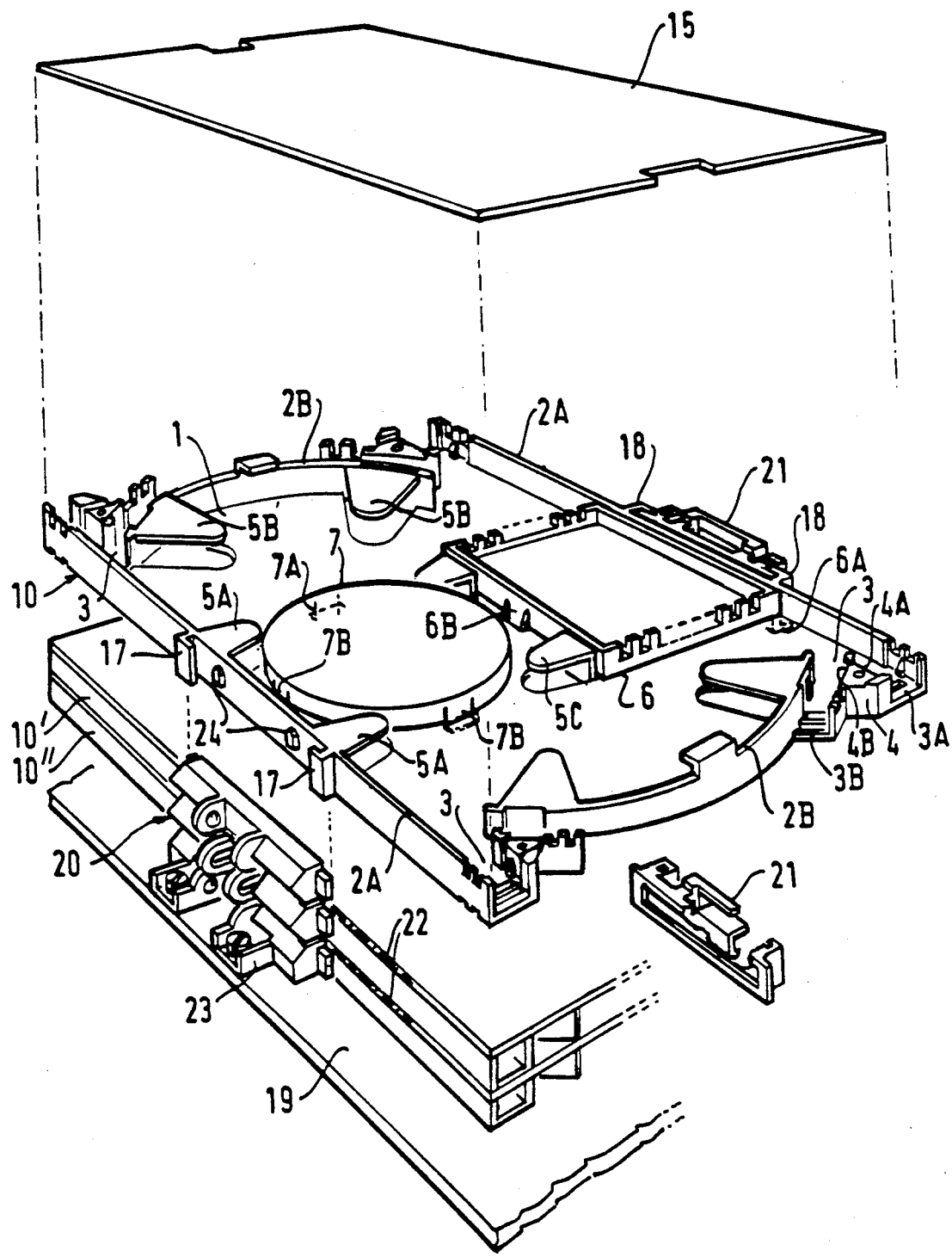
FIG. 1 is an exploded diagrammatic perspective view of an assembly of cassettes, and of one of the cassettes in said assembly of the present invention.

The assembly of stacked and hinged modules of the invention is, in particular, constituted by cassettes for optical fibers. FIG. 1 shows an end cassette 10 in the assembly, which end cassette is shown in exploded perspective, and two other cassettes 10' and 10" that are analogous to the end cassette, and that have already been stacked one o top of the other and individually hinged. The modules may be housings other than optical cassettes, which housings are assembled together to form an assembly of stacked and individually hinged housings, in accordance with the present invention.

The cassette 10 is described with reference to the embodiment of FIG. 1 or 2. It includes a substantially rectangular flat bottom 1 having its small sides partially truncated and curved. Two straight, opposite rim segments 2A and two curved, other opposite rim segments 2B surround the bottom. Four "double" accesses 3 for the fibers received in the cassette are delimited between the end portions of the rim segments on the bottom and at the four corners thereof.

Blocks 4 projecting from the bottom 1, each block being centered in a respective double access, divide each of said double accesses into two access channels 3A and 3B. The blocks are of the same height as the rim segments, and are substantially triangular in cross-section. Side faces 4A and 4B on each block face the end portions of the rim segments in the corresponding double accesses, and the sides of the corresponding access channels are delimited by the faces and the end portions. An extension 4C on each block extends its side face 4B facing the end portion of the rim segment 2B towards the outside of the cassette.

Tabs 5A on rim segments 2A, and tabs 5B on rim segments 2B extend parallel with the bottom 1 towards the inside of the cassette. Two other tabs 5C which are analogous to tabs 5A project from the bottom substantially to one side of the middle longitudinal axis thereof. The tabs 5A, 5B, 5C serve to hold the fibers coiled inside the cassette underneath them.

The bottom 1 is made of plastic and is molded. The rim segments, the blocks, and the tabs are obtained during molding of the bottom.

The bottom 1 is equipped both with a support 6 for receiving and holding optical fiber connections such as 16 thereon, and with a cylinder 7 for coiling the fibers. The support and the cylinder are removably mounted side-by-side over the width of the bottom on its middle portion. To this end, the support and the cylinder have respective sets of snap-fastening catches, the set on the support being formed by two rigid catches 6A and a third resilient catch 6B, and the set on the cylinder being formed by one rigid catch 7A and one or two resilient other catches 7B. The bottom 1 in turn has sets of openings (not referenced) corresponding in particular to the respective sets of catches on the cylinder and on the support, for the purposes of snap-fastening them thereon.

Figure 2:
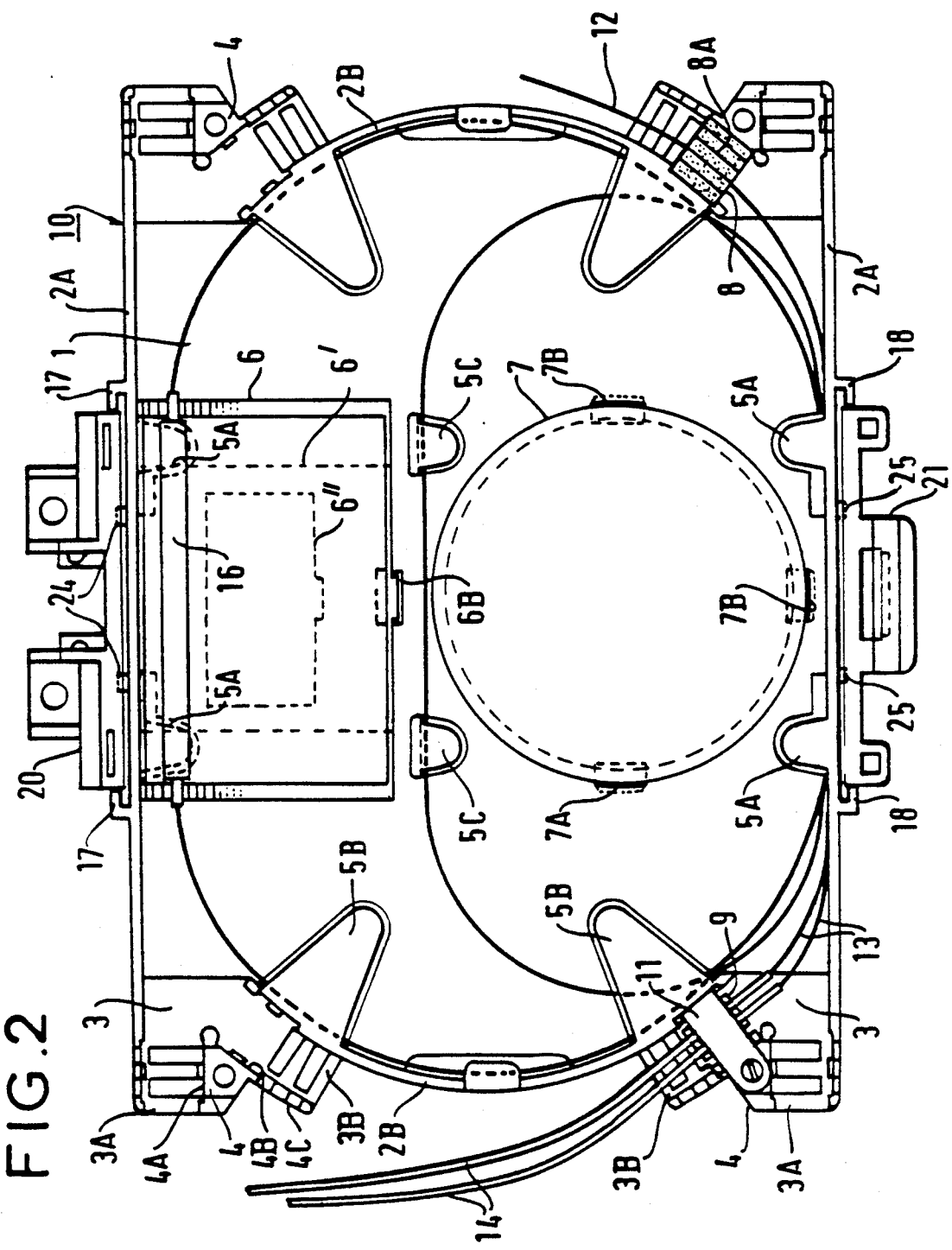
FIG. 2 is a plan view of an embodiment of said assembly or of the top end cassette thereof.
Figure 7:
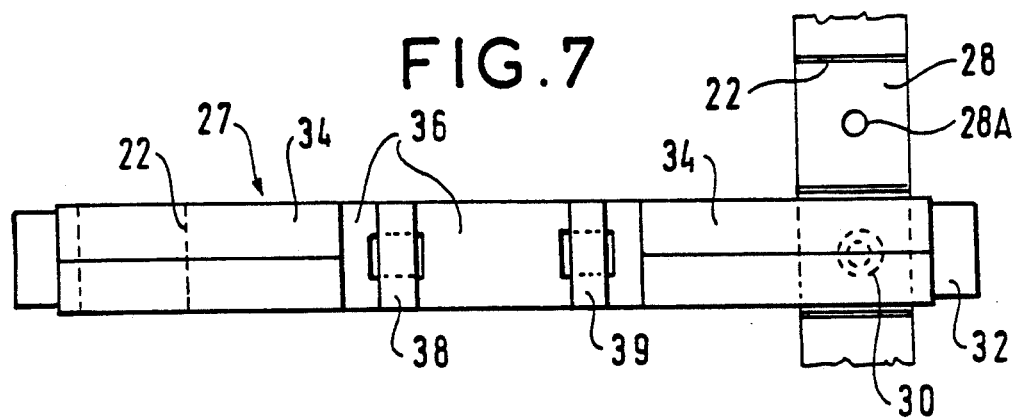
FIG. 7 is a front view of a "female" element of the assembling and hinging strip of the above-mentioned second embodiment.

The connection support is selected from different possible supports for different connections, comprising the above-mentioned support 6 and other supports such as 6' and 6" (FIG. 2). Optionally, the above-mentioned cylinder 7 is not used, in which case two supports 6, 6', 6" may be mounted on the bottom. Different sets of openings are initially provided on the bottom for selectively mounting the various elements 6, 6', 6", and 7 on the bottom, and for adapting the resulting cassette as required. The tabs 5A and 5C may be removed if necessary, to adapt the cassette to requirements.

On the cassette 10, two of the four double accesses 3 are selected, as is one of the two access channels 3A and 3B in each selected double access, as a function of how the cassette is used, thereby ensuring that the radius of curvature of the fibers entering the cassette does not drop below a minimum.

The two selected access channels are in turn optionally equipped with an element of a first type 8 and/or an element of a second type 9, for individually separating in line and holding the fibers received thereby.

The element of the first type 8 is assigned to bare fibers 12, and is constituted by a flexible slab which can be mounted and locked in an arbitrary one of the access channels. The slab has a series of slots 8A disposed side-by-side over the width of the access channel in which it is mounted and locked.

The element of the second type 9 is assigned to fibers 13 that are initially protected inside individual sheathing tubes 14. The element of the second type is constituted by a channel-section part having its facing flanges formed by respective series of teeth. The teeth delimit slots between one another, the slots on one flange facing the slots on the other flange and being disposed side-by-side over the width of the arbitrary access channel in which the element is mounted and locked. A tab 11 that is independent from the element 9 and from the bottom 1 is associated with the element. The tab is fixed via one of its ends to the block 4, and it extends over the element 9 to ensure that the tubed fibers are retained in the slots therein. In a variant, the tubed fibers may be retained in the access channel by means of a collar (not shown).

A cover 15 attached to the rim segments 2A, 2B closes the cassette 10 and protects the equipment on the bottom thereof, and the selected and equipped access channels. For the purposes of assembling and locking it on cassette 10', cassette 10 further includes a pair of guide catches 17, 18 on each of the rim segments 2A. The pairs of guide catches project from the outside faces of and over the height of the rim segments 2A. The catches in each pair are bracket shaped, they face each other, and they are symmetrical about the middle transverse axis of the cassette.

Cassettes 10, 10', and 10" are all at least outwardly identical. They can be superposed in a stack made on a plane base support 19 and they make up the assembly of stacked and hinged cassettes of the present invention thereon.

The assembly of cassettes includes an assembling and hinging strip 20 for assembling and hinging the individual cassettes 10, 10', and 10", and a set of individual locking devices 21 for locking the cassettes. The strip 20 and the locking devices 21 are received and retained in respective ones of the two pairs of guide catches 17, 18 on the various cassettes.

The assembling and hinging strip 20 defines hinges or pins 22 for the individual cassettes, with the exception of the first cassette 10" in the stack. The hinges 22 are at the same pitch as the cassettes over the height of the stack. The strip 20 has two fixing brackets 23 at that one of its ends which is situated at the bottom of the stack. The fixing brackets 23 are secured to the base support 19, and they render the first cassette fixed thereon, in a "closed" position.

A pair of retaining fingers 24 or 25 project from the outside face of each rim segment 2A. Each pair of fingers is disposed between the guide catches in the corresponding pair of guide catches 17 or 18. Each pair of fingers enables the strip 20 or the locking device 21 to be retained thereagainst when the strip or the locking device is mounted in the pair of guide catches.

With reference to FIG. 2, it is easy to understand that the four double accesses at the four corners of the cassette and the two access channels in each of the double accesses make it possible to select two access channels for the fibers, which access channels are part of two of the double accesses which are in turn selected. In the same way, hinge assembling each of the cassettes along one of its rim segments 2A, and locking it along the other rim segment are also performed selectively. Hinge assembling is performed on that one of rim segments 2A to which the two selected double accesses 3 do not belong, when the fibers enter the access channels 3A or 3B along rim segments 2B.

In this way, the hinge axis of each cassette in the assembly is at a distance from the two selected double accesses, which distance is substantially equal to the width of the cassette. As a result, the fibers, which are also retained in each selected access channel, are not subjected to an excessive amount of curvature when the cassette is being opened in the assembly of cassettes.

The assembling and hinging strip 20 is described in detail with reference to FIGS. 3 to 10. The strip has an axis of symmetry XX over the height of the stack of cassettes in the assembly. FIG. 3 shows a first embodiment of the strip 20 to the left of the axis XX, and a second embodiment of the strip to the right of the axis, the second embodiment merely being outlined by dashed lines in FIG. 4.

The essential difference between the two embodiments is that, in the first embodiment, the strip 20 is made of one molded piece, whereas, in the second embodiment, the strip is formed of individual molded elements such as 26, 26A, and 27 which are assembled together without touching one after another by means of two assembling tapes such as the tape 28 that is shown. Similarly, the one-piece strip has lengths that are connected together but not touching, which lengths correspond to the individual elements 26, 26A, and 27 and are given the same references as these elements.

Figure 8:
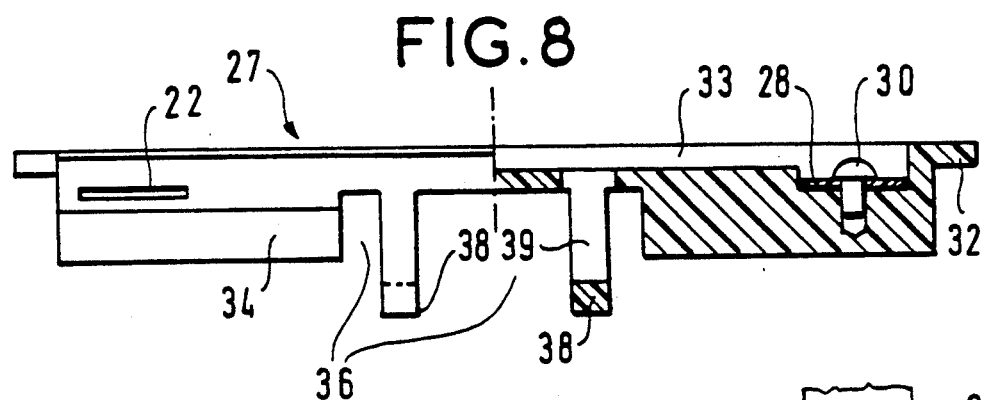
FIG. 8 is a plan view in half-section of the element shown in FIG. 7.
Figure 9:
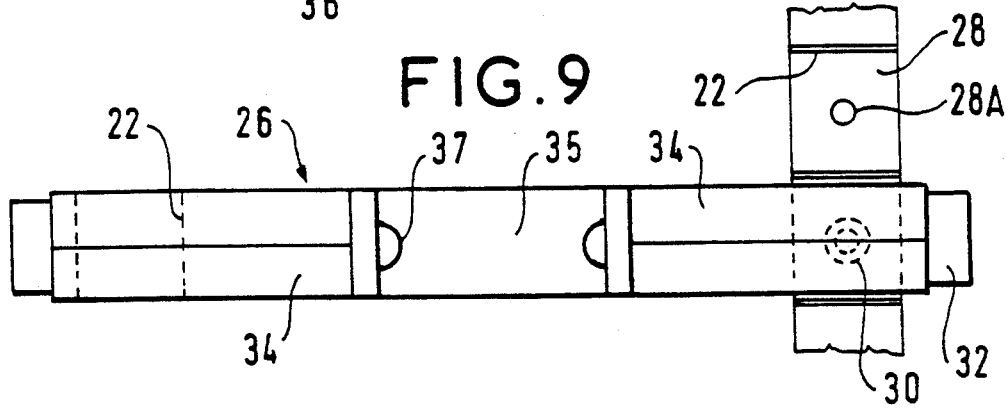
FIGS. 9 and 10 are two views corresponding to FIGS. 5 and 6 of the "male" (but not bottom) element of the strip shown in FIGS. 3 and 4, for the second embodiment.
Figure 10:
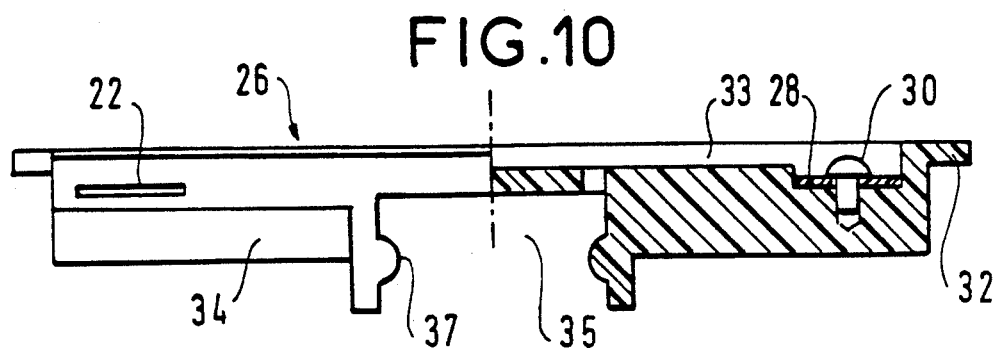

The lengths differ from the individual elements in that two through slots 29 for receiving the assembling tapes are provided in each of the individual elements and over the height thereof. Each assembling tape 28 has holes 28A at the assembly pitch of the individual elements. Each tape is threaded through the slots 29 in the individual elements and is fixed to each of the elements by means of a screw 30 or the like engaged in the corresponding hole 28A, and screwed or fastened in the individual element in question (FIGS. 6, 8, 10).

This possible difference in the construction of the strip 20 corresponds to obtaining hinges 22 in different ways. In the one-piece strip, the hinges 22 are defined by sections of small thickness and small height provided directly on the strip between the successive lengths thereof, whereby the lengths are connected together one after another. In the strip having individual elements, the hinges 22 are defined on each tape 28, also by means of sections of small thickness and small height along the tape, each section being situated between two successive individual elements.

In both of the embodiments, the small sections or hinges 22 are at the same pitch as the cassettes stacked in the assembly of cassettes.

The other dispositions provided on the strip 20 made of one piece or having assembled individual elements are identical. With reference to FIGS. 3 to 10 (the figure being specified where applicable), and optionally to FIGS. 1 and 2 for the functions performed with the corresponding cassette, said other dispositions are as follows:

a pair of side latches 32 on each length or element and received in the pair of guide catches 17 of the cassette;

a relatively long and wide rear recess 33 (FIGS. 6, 8, and 10), in each length or element, in which recess the pair of retaining fingers 24 on the cassette are received and locked;

a pair of front abutments 34 on each length or element, the pair of abutments being active in the "open" position of the cassette on the pair of front abutments on the lower adjacent cassette when said adjacent cassette remains in the closed position;

a central front recess 35 or 36 (FIGS. 3, and 5 to 10) over the height of each length or element, but of slightly different widths and organized differently from one length or element to the adjacent length or element, thereby alternately defining a "male" length or element 26, 26A and a "female" length or element 27 locking together when one of the two cassettes in question is in the open position and the other is in the closed position;

a pair of inside projections 37 (FIGS. 3 to 6, and 9 and 10) projecting facing each other from the side edges of the front recess 35, the side edges projecting relative to the ends of the front abutments 34, and the projections on the side edges being substantially level with the ends of the front abutments; and a pair of branches 38 in front recess 36, each branch having an aperture 39 (FIGS. 3, 4, 7 and 8), the branches being slightly offset from the edges of recess 36 to obtain a certain amount of flexibility, and being received in recess 35 against the edges thereof, with the projections 37 being inside the apertures 39, when the upper cassette in question is in the open position on the adjacent lower cassette which is in the closed position.

The first element or length 26A at the bottom of the stack is different from the elements or lengths 26 in that it has the pair of fixing brackets 23 used for fixing it to the base support 19. The brackets extend from the edges of the recess 35 and under the pair of front abutments, which abutments are truncated and referenced 34A.

Each of the front abutments 35 has its "top" face and its "bottom" face chamfered at 45°. The edge where the top face and the bottom face meet is half way up the height of each length or element. The abutments define the open position for each individual cassette at 90° from its closed position, and they prevent the cassette from being opened beyond the defined position.

Naturally, in a variant, a female element may constitute the first fixed length at the bottom of the stack on the base support, the following elements then being alternately male and female.

The cassettes are mounted and stacked on the assembling strip 20 after the strip has been assembled, if it is made up of individual elements. The fixing brackets 23 may then be fixed to the base support 19, or that may be done last.

Once the hinge edge of the cassettes has been selected, the pair of guide catches 17 on the rim segment 2A corresponding to the first cassette are threaded onto the side latches 32 of the length or element 26A of the strip. This is done by clearing away all the upper lengths or elements by folding them about the hinge 22 adjoining the length or element 26A.

The other cassettes are mounted successively and identically to the first cassette.

Once the assembly of cassettes has been formed and fixed on the base support, the strip 20 holds the cassettes in the closed position on one another. However, this natural way of holding the cassettes closed is not entirely reliable. The casettes are locked to one another in the closed position and also in the open position by means of locking devices 21 individually attached to the other rim segment 2A of each of the cassettes. The locking devices 21 also enable a group of successive upper cassettes to be locked to one another in the open position, while the lower cassette(s) forming the other group are in turn locked together in the closed position. The locking devices release the individual cassettes for the purposes of moving them from one group to the other.

Figure 11:
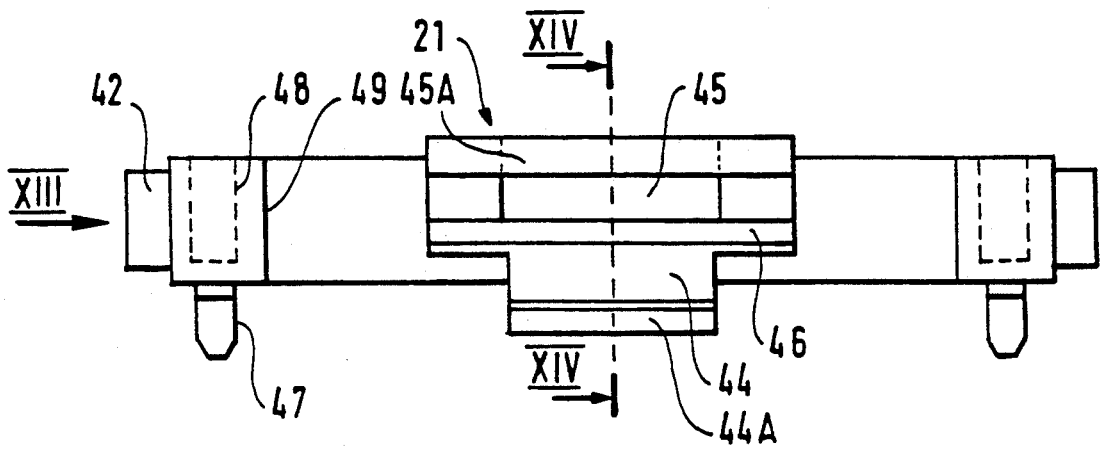
FIGS. 11 and 12 are respectively a front view and a plan view of one of the locking devices assigned to the cassettes and belonging to said assembly of cassettes shown in FIG. 1.
Figure 12:
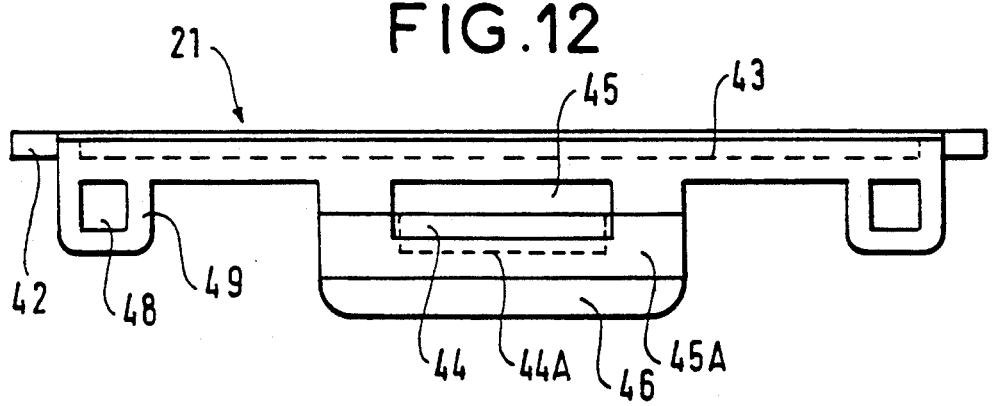
Figure 13:
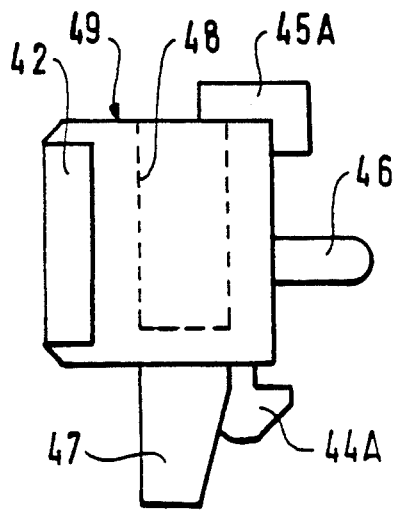
FIGS. 13 and 14 are respectively a side view and a section view of the locking device, respectively in the direction of arrow XIII, and on line XIV—XIV shown in FIG. 11.
Figure 14:
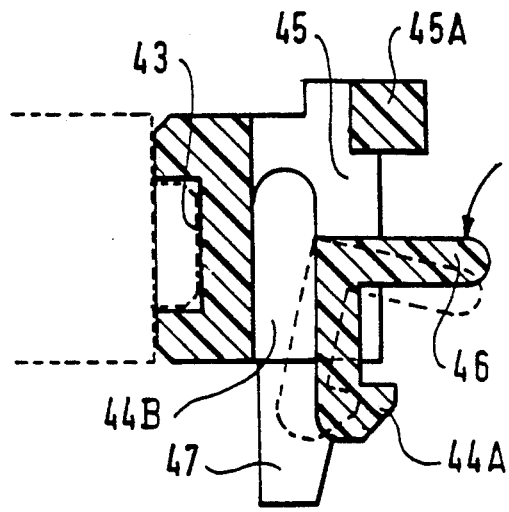

The locking devices 21 are identical to one another. They are described with reference to FIGS. 11 to 13 which show one of the locking devices.

The locking device 21 is an elongate molded body, similar in height and in length to a length or element of the above-described assembling and hinging strip. Dispositions that are also analogous to the above-described dispositions are provided on the locking device 21, for the purposes of mounting it on an arbitrary one of the cassettes against the available rim segment 2A thereof.

For the purposes of mounting it, the device has a pair of side latches 42 and a rear recess 43.

For the purposes of locking one cassette to another, the middle portion of the front face of the device includes:

a snap-fastening catch 44 projecting from the bottom edge of the device, considered horizontally, the catch having an end tooth 44A in the form of a forward-facing hook;

an opening 45 which is open on the front face and on the top face of the device, and which is fitted to the dimensions of the hook on said front face, but which leaves a certain amount of possible clearance for the snap-fastening catch and the hook thereon on said top face, the opening being delimited by a reinforced edge 45A opposite from the snap-fastening catch;

a lever 46 for actuating the snap-fastening catch 44, which lever is formed thereon at the opposite end of the catch from its tooth 44A, and projects from the front face to delimit the other edge of the opening 45 on the front face and facing the reinforced edge 45A; and a recess 44B to the rear of the snap-fastening catch 44 to provide resilience therefor.

For the purposes of centering it on either one of the identical adjacent devices carried by the cassettes in the assembly when the cassettes are being locked together, the locking device further includes:

a pair of centering fingers 47 projecting over a considerable distance from the bottom face of the device; and a pair of centering holes 48 formed in axial alignment with the individual centering fingers and open on the top face.

The centering fingers and centering holes are delimited by two projecting portions 49 of the device, which portions adjoin the respective side latches 42 but are offset from the central snap-fastening catch 44. The centering fingers 47 have their front faces and the ends of their other faces chamfered. In this way, it is easy to engage the fingers in the centering holes of another identical device carried by the cassette that is adjacent to and beneath the cassette carrying the device in question. The centering avoids the hinges being subjected to a special force while the devices 21 are being locked together.

Figure 15:
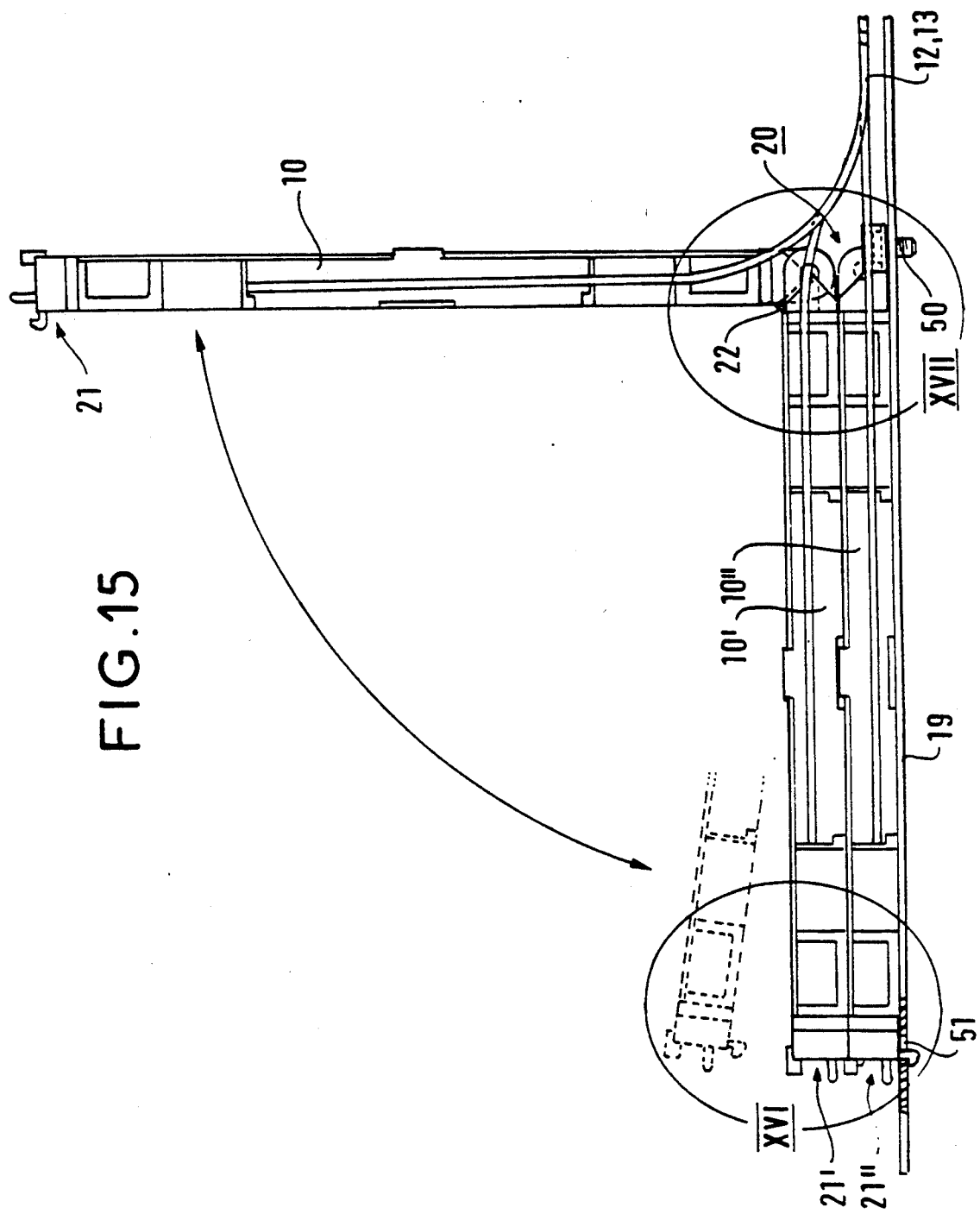
FIG. 15 is a profile view of the assembly of cassettes shown in FIG. 1, with the top cassette in the assembly being open.
Figure 16:
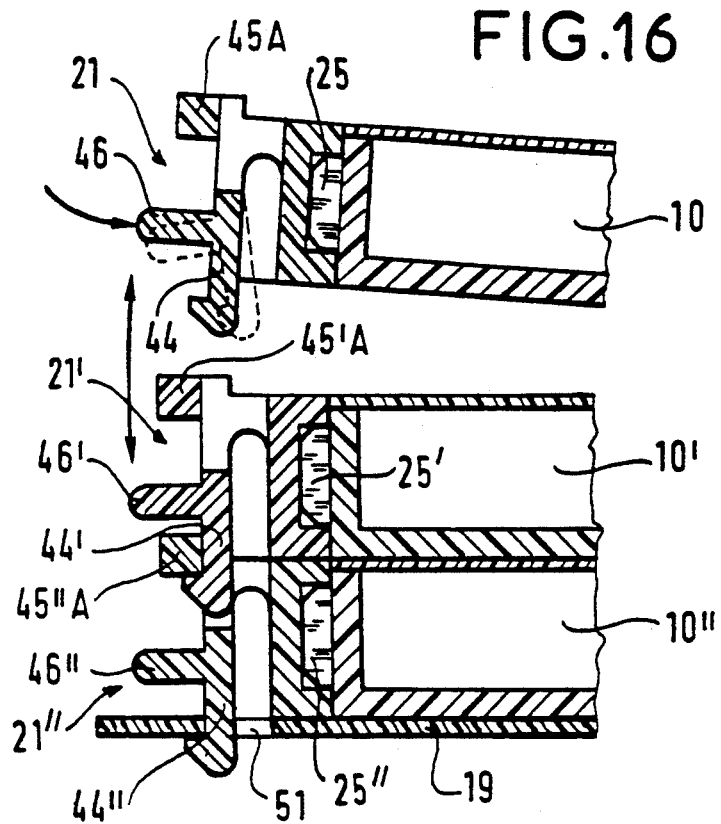
FIGS. 16 and 17 are respective section views on a larger scale of portions XVI and XVII shown in FIG. 15.
Figure 17:
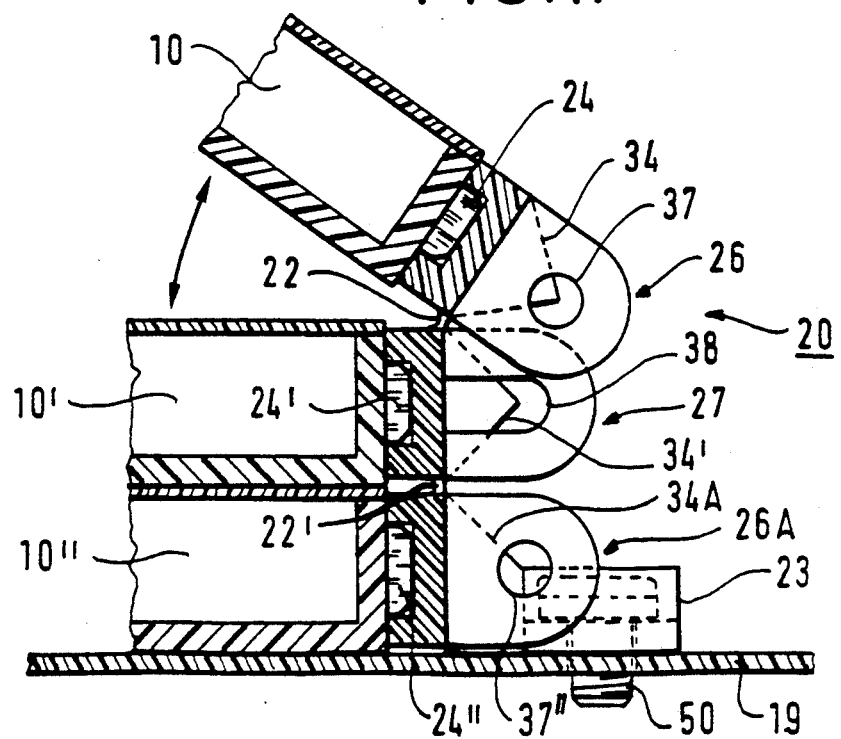

FIGS. 15 to 17 clearly show how the cassettes in the assembly they form on the plane base support are hinge assembled and locked together, and how they may be opened. The strip 20 shown is the one-piece strip in the above-mentioned first embodiment. The three lengths of the strip are successively referenced 26A, 27, and 26 for the three cassettes shown.

In FIGS. 15 to 17, the individual hinges 22, the locking devices 21, and the other operational dispositions defined by the elements or lengths 26A, 27, and 26 of the strip 20 and on the locking devices 21 are distinguished from one cassette to another by the use of the "prime" symbol or of the "double prime" symbol.

The strip 20 is secured to the base support 19 by means of a screw 50 being engaged in the support via each fixing bracket 23. This way of fixing eliminates the hinge of cassette 10" by fixing the cassette in the closed position. At the opposite side from the fixing brackets 23, cassette 10" is also locked to the base support by means of the snap-fastening tooth 44" on its device 21", which tooth is received in a corresponding opening 51 in the base support. The two centering fingers on device 21" may be eliminated, or they may be received in two corresponding openings in the base support.

Cassette 10', shown in the closed position, has its locking device 21' centered and snap-fastened on device 21".

Cassette 10 is shown in the open position. The bottom faces of abutments 34 then bear against the top faces of abutments 34', and projections 27 are engaged in the apertures in resilient branches 38. The cassette is opened about the hinge 22 almost adjoining the bottom edge of the rim segment 2A in question. To open the cassette, device 21 is firstly unlocked by actuating lever 46 so as to release the snap-fastening catch from device 21'.

FIGS. 18 to 23 concern the construction of an assembling and hinging strip of a third embodiment. The strip is made up of individual elements, such as the element 60 described in detail with reference to FIGS. 18 to 20, which elements are all identical and are fitted together directly.

The element 60 is a molded body provided with dispositions that are similar to the dispositions provided on each length or element of the above-described strip, or on the above-described locking device, with respect to mounting the element on an arbitrary one of the cassettes, and on one of the two rim segments 2A on the cassette.

For the purposes of such mounting, the element has a pair of side latches 62 received in the guide catches 17 on the cassette 10, and a rear recess 63 receiving the pair of retaining fingers 24 on the cassette.

However, specific dispositions are provided for assembling the element with another identical element, and for obtaining a hinge. The specific dispositions are defined on a pair of lugs 64 which are almost at the ends of the element, which adjoin the side latches 62, and which project over the height of the front face of the element, and relative to the top edge of the element.

Each of the lugs has a shoulder level with the top edge of the element dividing the lug into a rigid bottom portion 65 integral with the front face, and a top portion 66 that is made slightly flexible and is deformable about the join where it meets the bottom portion. The top edge and the bottom edge of each of the lugs are rounded. The front edge is straight.

Each of the bottom portions of the two lugs has a central hole 67. Each of the top portions has a cylindrical finger 68 projecting therefrom. Since the top portions 66 are closer together than the bottom portions 65, the cylindrical fingers 68 project from the outside faces of the top portions.

The top portions 66 fit against the inside of the bottom portions of another identical element when the two elements are assembled together. The cylindrical fingers 68 on one of the elements are engaged in the holes 67 in the other element, thereby defining a hinge axis 22A, analogous to one of the above-mentioned hinges 22. The inside edge 69 of the shoulder between the portions 65 and 66 acts as an abutment delimiting a maximum open position about one of the resulting hinges.

To define two stable positions, namely a closed position and an open position, about a hinge axis or a hinge, each of the bottom portions 65 has a sector shaped projection 70 on its inside face, and each of the top portions 66 has two indents 71A and 71B in its outside face. The projection 70 is on the edge of the hole 67 and is of small height. The two indents are at the base of the cylindrical finger 68; They are complementary to the projection 70 and are offset by 90° relative to each other, as shown between their axes in FIG. 20. One of the indents 71A corresponds to the position of the projection when two elements are assembled together, and defines the closed position.

The element 60 further includes a central fixing bracket 73 projecting relative to the front face from the bottom edge thereof. The bracket 73 has two holes 74.

Figure 21:
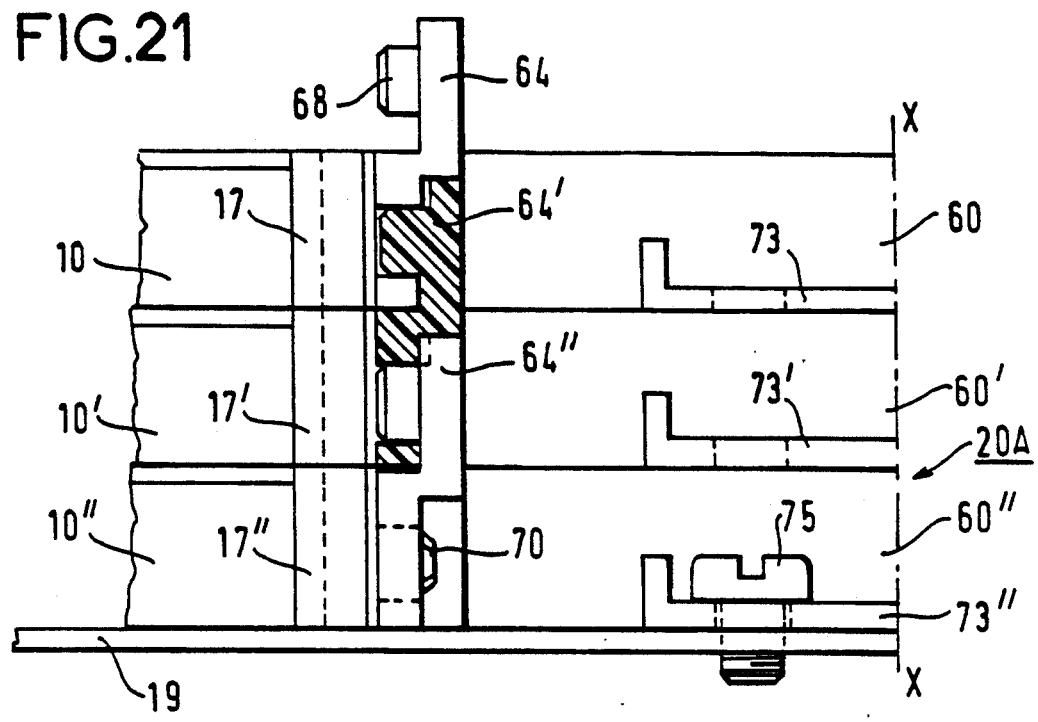
FIGS. 21, 22, and 23 are respectively a front view partially in section, and two side views partially in section, in the directions of corresponding arrows and on corresponding lines XXI—XXI, XXII, XXIII—XXIII shown in FIG. 19, showing the assembly of cassettes hinged and assembled together by means of the strip of the third embodiment.
Figure 22:
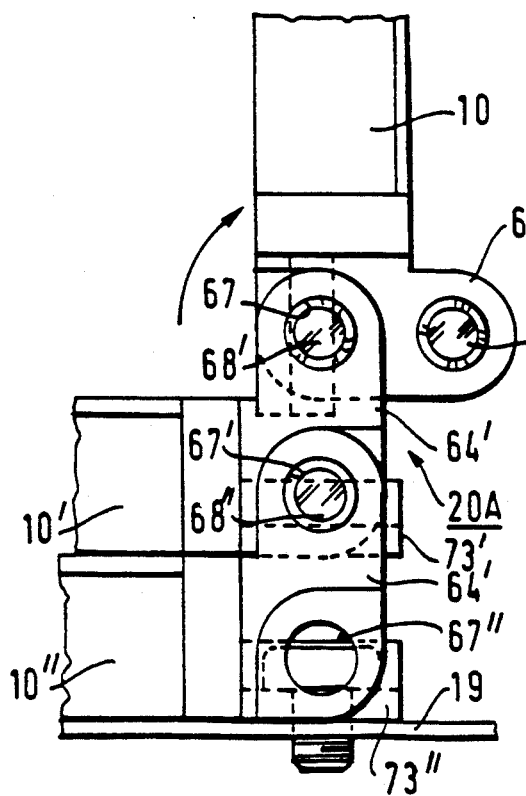
Figure 23:
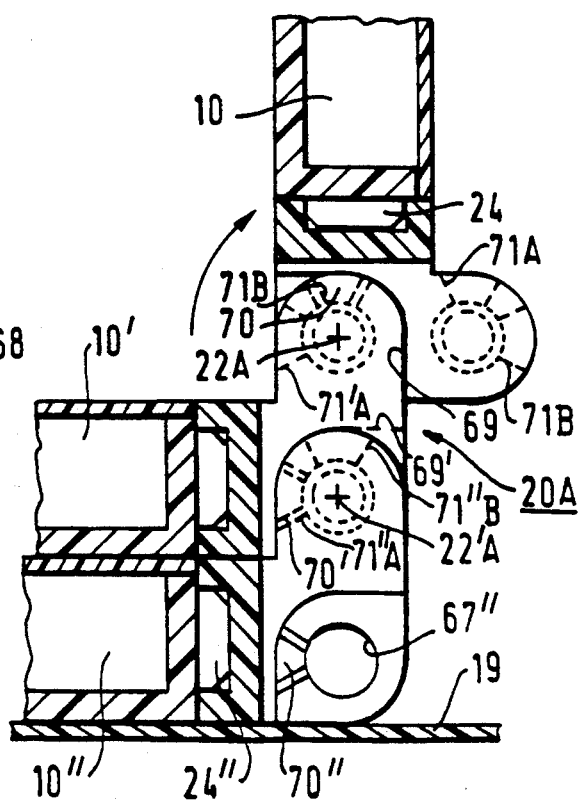

FIGS. 21 to 23 show an assembling and hinging strip, given the overall reference 20A, which is made up of identical elements 60, 60', 60", and which is mounted on the above-mentioned cassettes 10, 10', and 10" and on the above-mentioned base support 19 therefor. Making up the strip and obtaining the hinge axes is explained by distinguishing the identical operational dispositions provided on the various elements 60, 60', and 60" by means of the "prime" symbol or the "double prime" symbol.

The strip 20A is made up either initially, or as the cassettes 10", 10', and 10 are being stacked on the base support 19, each of the cassettes then carrying its respective element 60", 60', 60.

Element 60" is fixed to the base support 19 by means of two screws 75 locking the fixing bracket 73" of the element on the base support. The holes 67" left empty correspond to the absence of a hinge for cassette 10". However, element 60" does have its cylindrical fingers 68" engaged in the holes 67' in element 60', the fingers thereby defining the hinge 22'A for cassette 10'. The hinge 22A for cassette 10 is defined in analogous manner by means of cylindrical fingers 68' being engaged in the holes 67 in element 60.

The closed positions for each of cassettes 10' and 10 are defined by the projection-indent pairs 70' and 71"A, and 70 and 71'A. The open positions therefor are defined by the projection-indent pairs 70' and 71"B, and 70 and 71'B, as shown in FIG. 23 for cassette 10 which is shown in the open position. In the open position, the inside edge or abutment 69 of each shoulder bears against the top portions of lugs 64', and prevents the cassette 10 from opening beyond 90°. The same applies between abutment 69' and lug 64" when cassette 10' is in turn opened.

The central fixing brackets 73' and 73 on elements 60' and 60" have no purpose in the strip 20A. They may be omitted, and element 60" is then the only element to have such a bracket 73", thereby distinguishing that element from the other elements.

In the above-described embodiments, the one-piece assembling strip, or the individual elements making up the strip, are molded. The same applies to the locking devices.

We claim:

1. An assembly of stacked and hinged modules comprising: a plane base support, a plurality of individual modules stacked on said base support, each of said modules being flat and substantially rectangular, and having two large superposable faces and two pairs of opposite peripheral edges, said assembly including a support and holding and hinging means for holding and hinging the individual modules at one edge of one of said pairs of opposite peripheral edges, a first module of said assembly comprising means for fixing said first module to said base support and defining a closed position for each of said other modules of said stack relative to said first module, said support comprising an assembling and hinging strip defined by said stack of modules including firstly, first assembling and retaining means for assembling and retaining said modules substantially against a front face of said strip along said first edge of said one of said pairs of opposite edges, and secondly, individual hinges respectively at a pitch of said stacked modules of said assembly, and wherein on said first one of said pair of opposite edges, each of said modules is equipped with second assembling and retaining means, complementary to said first assembling and retaining means for locking each module to said strip, and wherein said strip includes at least one fixing bracket on said first module for fixing said strip to said base support.

2. An assembly according to claim 1, wherein said modules are cassettes for coiling and interconnecting optical fibers, and wherein each cassette includes four accesses, substantially at four corners of the cassette, for receiving said fibers, and where selected accesses receiving said fibers are those accesses furtherest from the first edge carrying said strip.

3. An assembly according to claim 1, wherein said second assembling and retaining means include a pair of guide catches projecting from the front face of said first edge of each module, and wherein said first assembling and retaining means include pairs of successive side latches defined on said strip in the height direction of the assembly of modules, each pair received in the pair of guide catches of a respective one of the modules.

4. An assembly according to claim 1, wherein, for each module in said assembly, said first and second assembling and retaining means include a recess and at least one corresponding retaining finger received in said recess, one of said means being on a rear face of said strip and at the same pitch as the modules, and the other of said means being on the front face of said first edge of each module.

5. An assembly according to claim 1, wherein said modules include successive elements along said strip, the front face of the strip includes successive abutments extending facing one another on the successive elements of the strip, but being offset angularly by substantially 90° from one of said elements to the next element, thereby defining an open position about the hinge for the module in question.

6. An assembly according to claim 5, wherein said strip is made of one piece and includes sections of small thickness extending parallel to and spaced apart from one another, constituting said hinges and defining unit lengths constituting said elements, said elements being connected directly to one another by said hinges, and said elements and said modules corresponding to one another individually in said assembly.

7. An assembly according to claim 6, wherein, on the front face of the strip, said strip further includes a series of alternate projections and apertures, one of the projections in each series being on a male one of said elements, and the following aperture in the series in question being on a following female element, with a substantially same angular offset between them as an angular offset between the abutments of said male element and said female element, so as to constitute, by resilient snap-fastening, a stable open position about the hinge for the module in question.

8. An assembly according to claim 7, wherein said abutments project parallel to one another from the front faces of said elements, and have their facing faces chamfered at 45°.

9. An assembly according to claim 8, wherein each male element includes a first central front recess dividing the abutment of the male element in question in two, and having one of said projections on each of its side edges, and each female element includes a second central front recess, slightly larger in width than said first recess, dividing the abutment of said female element in question in two, and having a pair of resilient inside branches projecting from said second recess, and in each of which is formed one of said apertures.

10. An assembly according to claim 5, wherein said strip is constituted by a plurality of individual ones of said elements assembled together without touching one another by at least one assembling tape fixed to each of said elements and defining said hinges, and said elements and said modules correspond to each other individually in said assembly.

11. An assembly according to claim 10, wherein each individual element has at least one through slot in the height direction of each corresponding module, and said slot receiving and retaining said at least one assembling tape.

12. An assembly according to claim 10, wherein said at least one assembling tape has sections of small thickness parallel to and spaced apart from one another, constituting said hinges.

13. An assembly according to claim 5, wherein said strip is constituted by individual elements fitted together one after another, and each equipped with a pair of cylindrical hinge fingers and a pair of corresponding holes for fitting together successive elements of adjacent modules in said stack and simultaneously defining said hinges, and wherein said elements and said modules correspond to each other in said assembly.

14. An assembly according to claim 13, wherein each of said individual elements fitted together includes a pair of lugs adjacent respective sides thereof and projecting from a front face and a top edge, each of said lugs presenting a shoulder dividing it into two fitting portions, the top portion projecting from the top edge and being substantially resilient, and the bottom portion being rigid on said front face, said bottom portion and said top portion having faces fitting against each other, and having said cylindrical hinge finger and a corresponding hole on the fitting faces.

15. An assembly according to claim 14 wherein each of said abutments is constituted on a respective one of said lugs on a respective one of said elements by an edge of the shoulder between said top portion and said bottom portion, the top edge of said top portion of the following element fitted on the element in question being received against said edge of the shoulder.

16. An assembly according to claim 14, wherein, on the fitting faces of said bottom portion and said top portion, each lug includes a projection on one of said fitting faces, and a first indent complementary to said projection on the other of said fitting faces, with an angular offset between the projection and the indent being substantially the same as the angular offset between the abutments of successive fitted-together elements, and constituting, by resilient snap-fastening, a stable open position for the module about the hinge in question.

17. An assembly according to claim 16, wherein each lug includes a second indent which is complementary to but not angular offset from said projection, which second indent is situated on that one of said top portion and said bottom portion having said first indent.

18. An assembly according to claim 5, wherein the edge opposite from the first edge of each of the modules is equipped identically to the first edge with second assembling and retaining means for selectively mounting said strip on one of the edges referred to as the first hinge edge.

19. An assembly according to claim 18, further including locking devices for locking the modules to one another, said locking devices being mounted individually on the opposite edge from said first hinge edge of each module, and being individually equipped with third assembling and retaining means identical to said first assembling and retaining means provided on said strip.

20. An assembly according to claim 19, wherein each locking device includes a central snap-fastening catch projecting from a front face and from a bottom face of the device, and a corresponding central opening opening out in said front face and in a top face of the device, the central snap-fastening catch of the device mounted on one of the modules being inside a central opening of the device mounted on the following module when the modules are stacked on one another.

21. An assembly according to claim 20, wherein each device further includes a lever for actuating said central snap-fastening catch, which lever is integral therewith and projects from the front face of the device.

22. An assembly according to claim 21, wherein each device further includes a pair of centering fingers projecting from either the top face or the bottom face, and a corresponding pair of centering holes opening out either in the bottom face or in the top face.

23. An assembly according to claim 20, wherein said base support has an opening for receiving the central snap-fastening catch of said first module so as to fix it to said base support.

* * * * *